(12) United States Patent
Blankenburg et al.

(10) Patent No.: US 10,823,559 B2
(45) Date of Patent: Nov. 3, 2020

(54) MEASURING DEVICE AND METHOD FOR TRIANGULATION MEASUREMENT

(71) Applicant: Pepperl + Fuchs GmbH, Mannheim (DE)

(72) Inventors: Christoph Blankenburg, Mutterstadt (DE); Hendrik Steinmann, Griesheim (DE)

(73) Assignee: Pepperl+Fuchs SE, Mannheim (DE)

( * ) Notice: Subject to any disclaimer, the term of this patent is extended or adjusted under 35 U.S.C. 154(b) by 235 days.

(21) Appl. No.: 15/791,750

(22) Filed: Oct. 24, 2017

(65) Prior Publication Data
US 2018/0120101 A1    May 3, 2018

(30) Foreign Application Priority Data
Oct. 27, 2016    (EP) ..................................... 16196032

(51) Int. Cl.
G01C 3/10    (2006.01)
G01B 11/25    (2006.01)
(52) U.S. Cl.
CPC ............ G01C 3/10 (2013.01); G01B 11/2513 (2013.01)
(58) Field of Classification Search
CPC ............................. G01C 3/10; G01B 11/2513
USPC ....................................................... 356/3.01
See application file for complete search history.

(56) References Cited

U.S. PATENT DOCUMENTS

| 6,542,249 | B1 | 4/2003 | Kofman et al. |
| 9,167,138 | B2 * | 10/2015 | Shpunt ................. H04N 5/2254 |
| 2004/0032974 | A1 | 2/2004 | Kriesel |
| 2006/0083422 | A1 | 4/2006 | Ernst et al. |
| 2009/0059241 | A1 | 3/2009 | Lapa et al. |
| 2014/0152769 | A1 | 6/2014 | Atwell et al. |

FOREIGN PATENT DOCUMENTS

| DE | 19638727 A1 | 3/1998 |
| EP | 2287560 A1 | 2/2011 |
| EP | 2442067 A1 | 4/2012 |
| WO | 2007/059780 A1 | 5/2007 |

OTHER PUBLICATIONS

"Digital micromirror device," Wikipedia, 2014, 3 pp. (Year: 2014).*
(Continued)

*Primary Examiner* — Daniel L Murphy
(74) *Attorney, Agent, or Firm* — LaBatt, LLC

(57) ABSTRACT

A measuring device for triangulation measurement comprises a light transmitter for emitting illuminating light; a transmitting optical system, which directs the illuminating light in a plurality of light strips to an object; a light receiver for generating a measurement image of the object by measuring of light thrown back from illuminated object areas; and an evaluation unit for determining form or position information of the object based on the measurement image. According to the invention, for the assignment of which area in the measurement image belongs to which light strip, the transmitting optical system is designed so that it directs the illuminating light in differently formed light strips to the object. In addition a corresponding method for triangulation measurement is described.

17 Claims, 4 Drawing Sheets

(56) References Cited

OTHER PUBLICATIONS

Application No. EP 16196032, Search Report, dated May 11, 2017, 2 pages.
Application No. CN 201711010588.9, Office Action, dated Nov. 5, 2019, received May 25, 2020, 20 pages (english translation).
Application No. KR 10-2017-0140004, Office Action, dated Oct. 27, 2019, received May 25, 2020, 2 pages (original KR office action not available).
Application No. KR 10-2017-0140004, Notice of Allowance, dated Jul. 16, 2019, received May 25, 2020, 6 pages.

* cited by examiner

MEASURING DEVICE AND METHOD FOR TRIANGULATION MEASUREMENT

REFERENCE TO RELATED APPLICATIONS

The current application claims priority to European Patent Application No. 16 196 032.3, filed on 27 Oct. 2016, which is hereby incorporated by reference.

TECHNICAL FIELD

The present invention relates in a first aspect to a measuring device for triangulation measurement according to the preamble of claim 1.

In a second aspect the invention relates to a method for triangulation measurement according to the preamble of claim 11.

BACKGROUND ART

In a triangulation measurement, light is emitted with a light transmitter onto an object to be examined. Light is thrown back from the illuminated object area and detected with a light receiver. The light receiver can have a spatial resolution and record a measurement image. According to the triangulation principle the light transmitter and light receiver are offset relative to each other in a direction transverse to the measuring direction or arranged at an angle to each other, so that, in the measurement image, the position of the illuminated object area depends on the distance of the object from the measuring device. Position or distance information relating to the object can thus be obtained.

An established measurement method uses a linear illumination. Here, illuminating light is emitted in the form of a line/a light strip, typically in the form of a straight line. Depending on the shape, or form, of the object, however, a straight line is not recorded in the measurement image, but instead a distorted line or a stepped progression. From the progression recorded in the measurement image it is therefore possible to derive shape or position information for the object. However, the measurement of an object with only one light strip is risky and can easily lead to errors. In a generic measuring device, therefore, a plurality of linear illuminations or light strips are used.

A generic measuring device for triangulation measurement comprises a light transmitter for emitting illuminating light, a transmitting optical system for guiding the illuminating light in a plurality of light strips to an object, a light receiver for generating a measurement image of the object through the measurement of light thrown back from illuminated object areas, and a control and evaluation unit for determining shape or position information of the object, based on the measurement image.

Correspondingly, it is provided in a generic method for triangulation measurement that:
- with a light transmitter, illuminating light is emitted,
- with a transmitting optical system, the illuminating light is guided in a plurality of light strips in the direction of an object,
- with a light receiver, light thrown back from illuminated object areas is measured and a measurement image of the object is recorded,
- with an evaluation unit, shape, or form, or position information of the object is determined based on the measurement image.

Such a measuring device and such a measurement method are described by the applicant for example in EP 2 287 560 B1 and are also known from U.S. Pat. No. 6,542,249 B1 and US 2004/0032974 A1.

In the case of such a multi-line use it is necessary to assign measurement information, i.e. image points in the measurement image, correctly to the different light strips. This is made particularly difficult if measurement lines recorded in the measurement image, which correspond to the light strips, have discontinuous steps and/or gaps. Steps and gaps can arise for example through steep sides of the object. This problem of correct assignment is also described as a "correspondence problem".

In order to ensure a correct assignment, the light strips can be emitted one after the other. However, this increases the measurement duration and can only be used in the case of essentially immovable objects. Alternatively, however, the light strips can also be generated with different optical wavelengths. To differentiate between the different optical wavelengths with the light receiver, however, cost-intensive color detectors are required. Furthermore, with equal dimensions to monochromatic detectors, they have a poorer resolution.

Finally, the object color also influences the intensity of thrown-back light in dependence on the wavelength of the respective light strip.

SUMMARY OF THE INVENTION

It can be regarded as an object of the invention to indicate a measuring device and a method for triangulation measurement, with which an object can be measured particularly reliably and precisely by a plurality of light strips.

This object is achieved through a measuring device having the features of claim 1 and through the method having the features of claim 11.

Advantageous variants of the measuring device according to the invention and the method according to the invention are the subject matter of the dependent claims and are additionally explained in the following description.

With the measuring device of the abovementioned type, according to the invention the transmitting optical system is designed, for the assignment of areas in the measurement image to the respective light strips in such a way that it guides the illuminating light to the object in differently formed light strips.

Similarly, in the method of the abovementioned type, according to the invention for assigning areas in the measurement image to the respective light strips, the illuminating light is guided with the transmitting optical system in differently formed light strips to the object.

It can be regarded as an essential idea of the invention to design the light strips of the illuminating light not in equal shapes or forms, but instead formed differently from each other. In this way, a strip recorded in the measurement image can unambiguously be assigned to a certain light strip. In particular, this is also possible for light strips arranged parallel to each other. A plurality of light strips can advantageously be emitted simultaneously and whereby no higher demands are placed upon the light receiver; for example color recognition is not required in order to differentiate the different strips.

In order to ensure that the light strips are different, each light strip can have a structure that differs from the structure of neighboring or all other light strips. In particular the transmitting optical system can be designed so that each light strip includes at least two neighboring, in particular parallel, lines. The lines can have a different width and/or one of the lines can be a dotted or dashed line. Different light strips can differ in the aforementioned width or in the type of dotted or dashed line or in the arrangement of the dotted or dashed line relative to the other line of the same light strip. The arrangement can indicate in particular whether a dotted line is above or below another line of the same strip. Each light strip can also comprise only a single dotted or dashed line, wherein the light strips differ in the type of the dots or dashes.

The evaluation unit can be designed to evaluate the measurement image and to identify therein discontinuous portions of a strip as parts of the same strip. For this, the structure of each discontinuous portion is detected. In the above examples, the structure can be such that a dotted and a continuous line lie one beside the other. In another structure, for example, a dashed and a continuous line can lie one beside the other. Those portions that have the same structure are assigned to the same strip. In addition this strip detected in the measurement image can be assigned to a certain light strip based on its structure.

The risk of an incorrect assignment of strips contained in the measurement image to the light strips transmitted to the sample is particularly high for neighboring (light) strips. It can therefore be provided for light strips neighboring each other to be different. Not all light strips need to be different from each other. In this way, a simpler design of the transmitting optical system is possible. Alternatively, however, all light strips can differ from each other, whereby a particularly high reliability is achieved.

If each light strip comprises at least two lines, it must be ensured that it can be reliably determined whether neighboring lines recorded in the measurement image belong to the same light strip or to two neighboring light strips. For this purpose, the transmitting optical system can be designed so that a distance between neighboring light strips is greater than, in particular at least double the size of, a distance between the lines belonging to the same light strip.

The transmitting optical system can also be designed so that each light strip comprises at least one wave line and different light strips differ in a frequency, amplitude, phase and/or form of the respective wave line. The wave line can for example be a sinus wave. Different forms can for example be a sinus waveform, rectangular form, sawtooth form or an arrangement in series thereof. These forms can also alternate with straight line portions, thus for example: two rectangular forms of the same strip can be spaced apart by a straight line portion. By selecting this distance to be different for different light strips, light strips can in turn be differentiated from each other.

The transmitting optical system can comprise a structured element which "imprints" on impinging illuminating light a spatial structure, in particular as described above. The structured element can for example be a diffractive optical element, which has a structure for generating the different light strips. A diffractive optical element can comprise a transparent carrier, for example a glass carrier, on which a microstructure is applied, for example grooves or other depressions. Impinging light is diffracted at the microstructure wherein partial beams of the impinging light interfere with each other. The light strips are hereby formed. The microstructure is formed so that light of a certain wavelength or of a certain wavelength range interferes in such a way that the desired different light strips are thereby formed. On the other hand, light of other wavelengths does not generate, upon diffraction at the diffractive optical element, the desired different light strips.

Accordingly the diffractive optical element can be designed for an optical wavelength range, wherein it generates the line forms, and the light transmitter can be designed so that solely illuminating light in this light wavelength range is radiated onto the diffractive optical element. For this, the light transmitter can comprise a laser of the desired wavelength or a corresponding color filter can follow the light transmitter.

Through the diffractive optical element, the different light strips can be generated simultaneously and without movement of a component of the measuring device. It is also unnecessary to illuminate different areas of the diffractive optical element one after the other. Instead, the whole diffractive optical element can be illuminated at the same time.

In alternative embodiments, the transmitting optical system can also have a multi-mirror array, of which the mirrors are orientated so that impinging illuminating light is further directed as different light strips. It is advantageous here that, by adjusting the mirrors, a change in the light strips is possible. For a simpler structure, the mirrors can also be rigidly mounted.

In a further embodiment the transmitting optical system has an array of microlenses, of which the lenses are arranged and formed so that impinging illuminating light is transmitted in the different light strips. For this, the lenses can be differently formed, in particular being partially darkened, in order to bring about different degrees of transmission.

Method variants also follow from the proper use of the described embodiments of measuring devices according to the invention. Method variants are also to be interpreted as variants of the measuring device.

BRIEF DESCRIPTION OF THE DRAWINGS

Further advantages and features of the invention are described below with reference to the attached schematic figures, in which.

The same components and those acting in the same way are generally identified in the figures with the same reference symbols.

DETAILED DESCRIPTION OF THE INVENTION

Figure 1:
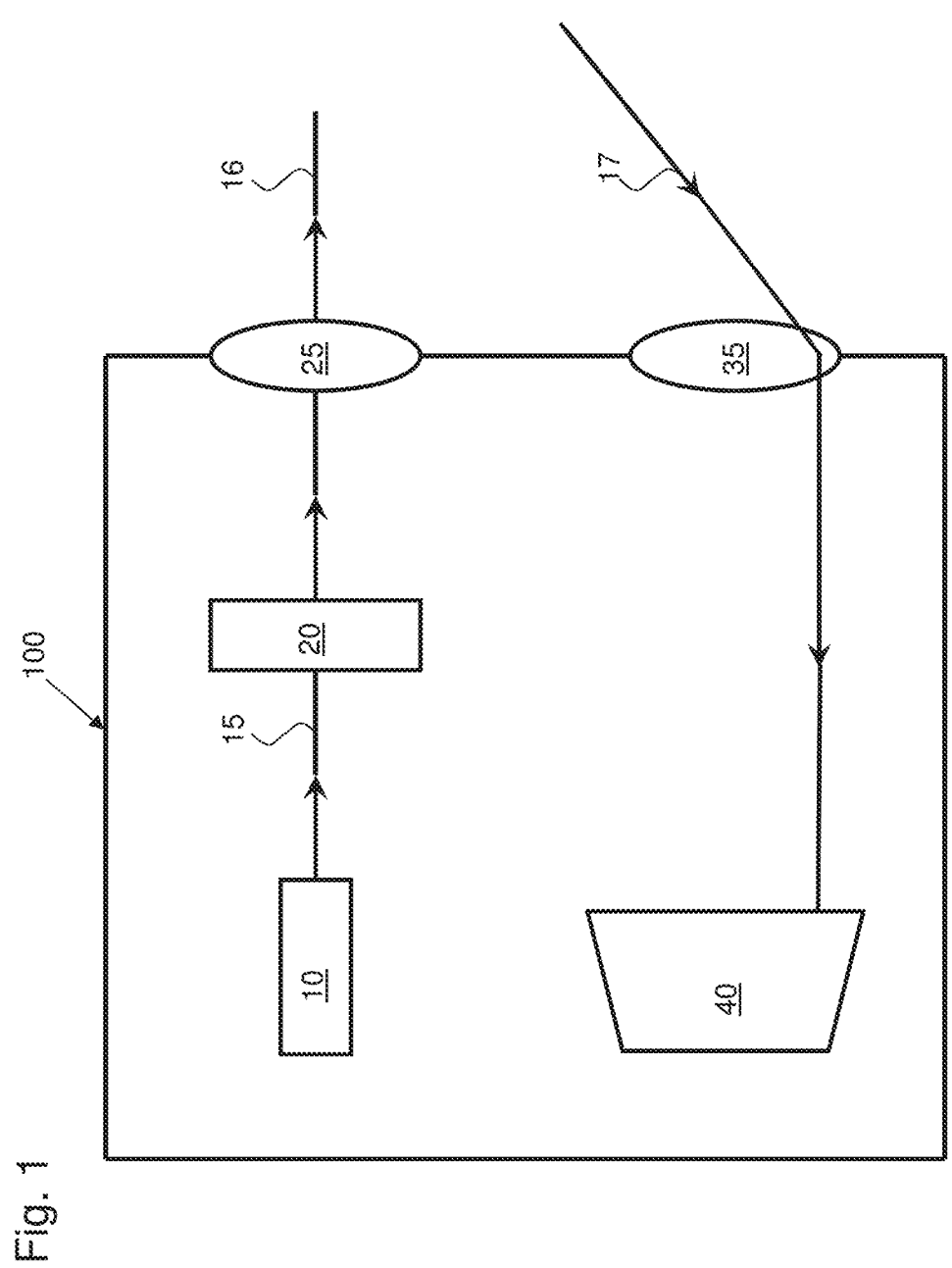
FIG. 1 shows a schematic representation of an embodiment of a measurement device according to the invention.

FIG. 1 shows an exemplary embodiment of a measuring device 100 according to the invention. This comprises a light transmitter 10 and a light receiver 40, which are arranged and designed for a triangulation measurement. The light transmitter emits illuminating light 15. With a transmitting optical system 20, 25, the illuminating light 15 in the form of a plurality of strips, which are also described as light strips 16, is directed further in the direction of an object 30 to be examined. In this way the illuminating light has in cross-section, i.e. in a section transverse or perpendicular to the propagation direction, a plurality of strips spaced apart from each other. The strips can be parallel to each other.

When the light strips impinge on the object 30, light 17 is thrown back from the illuminated object areas. The thrown-back light 17 is detected with the light receiver 40. The light receiver 40 can be a camera that records a two-dimensional measurement image. The thrown-back light 17 leads, in the measurement image, to strips corresponding to the light strips.

Figure 4:
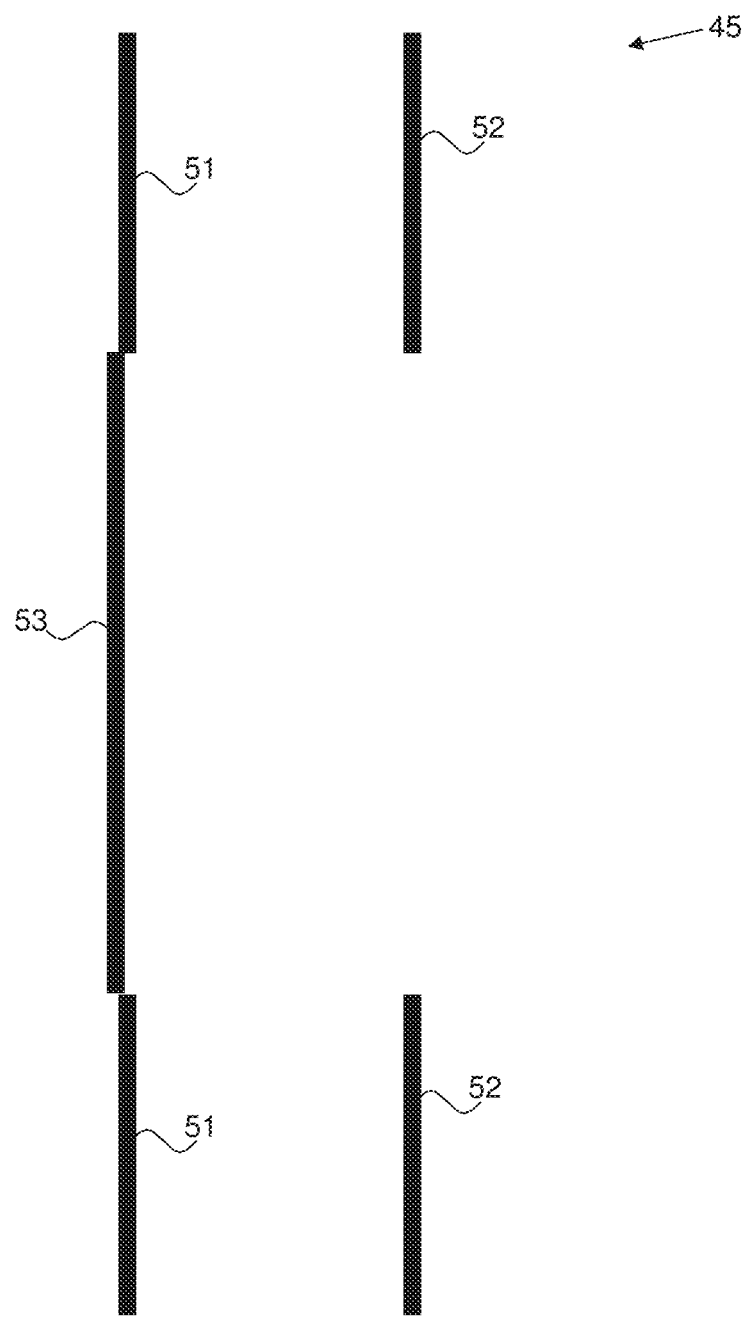
FIG. 4 shows a measurement image of a conventional measuring device not according to the invention.

A measurement image 45, as recorded by a conventional measuring device not according to the invention, is shown by way of example in FIG. 4. This shows two recorded strips 51 and 52, which are respectively interrupted and correspond to two emitted light strips. In a middle strip area 53, there is a step and only one of the strips 51 and 52 is recorded. In this case it cannot be clearly ascertained whether the middle strip area 53 belongs to the first strip 51 or to the second strip 52.

This correspondence problem is solved according to the invention by the design of the transmitting optical system 20, see FIG. 1.

For this, the transmitting optical system 20 has a structure, through which a structure/a pattern is "imprinted" on the illuminating light 15. The pattern is such that different light strips are different from each other. For this, the transmitting optical system 20 can for example be a diffractive optical element or comprise one of these. The diffractive optical element has a structure, for example depressions or grooves, through which light is diffracted and interferes in such a way that a plurality of light strips with different patterns are formed.

Figure 2:
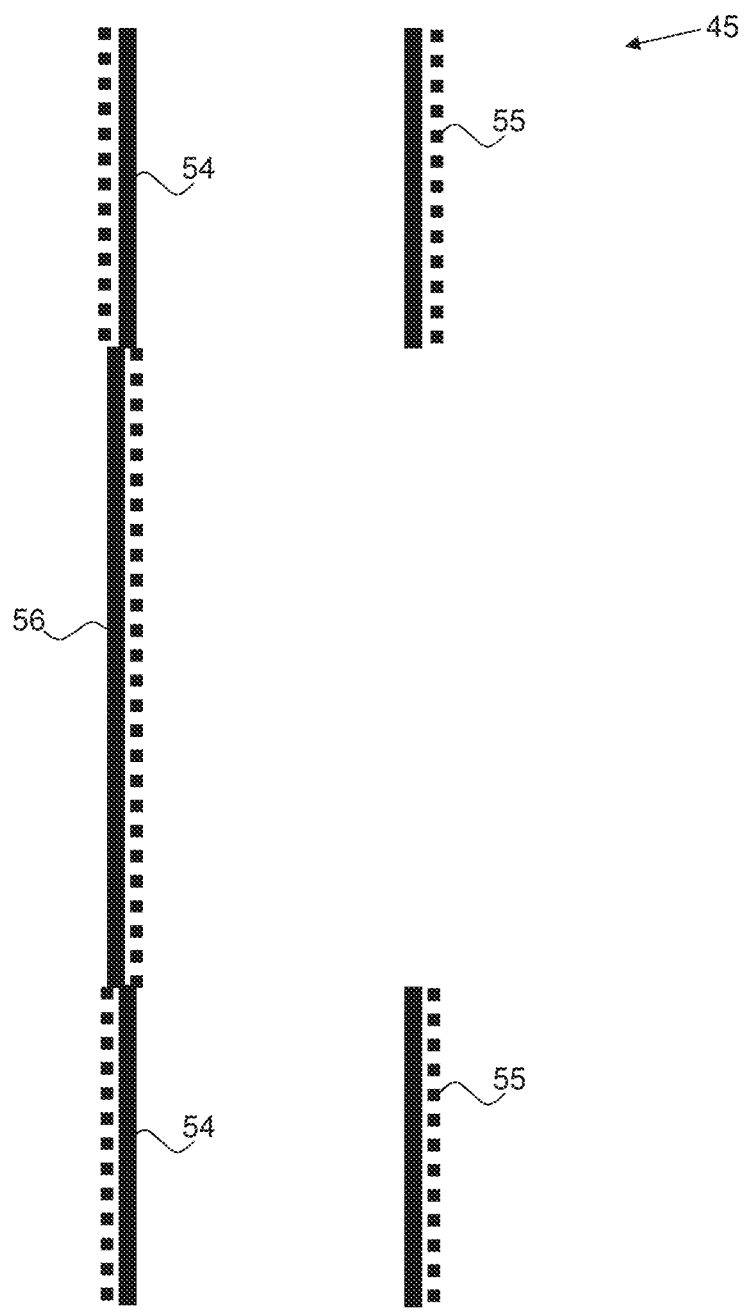
FIG. 2 shows an example measurement image of an embodiment of a measuring device according to the invention.

FIG. 2 shows by way of example a measurement image 45, as recorded by the light receiver 40, when an object 30 according to the invention is irradiated with the light strips, which have different patterns. In the measurement image 45, two light strip portions 54, which lie separated from each other in a line, and two light strip portions 55, which lie separate from each other in a line, can be detected. The interruption of the light strip portions 54 and the light strip portions 55 can be the case for example with an object 30 that has a staging or a step. In the measurement image 45, a single light strip portion 56 is recorded in the middle. This light strip portion 56 can be clearly assigned to the light strip portions 55, although it is spatially closer to the light strip portions 54. For this assignment, the pattern of the light strip portions 54, 55, 56 is evaluated. The light strip portions 55 and 56 have the same structure, namely each having a continuous line and a dotted line, which lies to the right of the continuous line in FIG. 2. In more general terms, the dotted line lies on a first side of the continuous line. The light strip portions 54 have a different structure, namely each having a continuous line and a dotted line, but which lies to the left of the continuous line in FIG. 2. In more general terms, the dotted line lies on a side of the continuous line lying opposite the first side. Through these different structures of the light strip portions, it can be concluded that those light strip portions with the same structure belong together. In addition it can be concluded from the structure which light strip portions in the measurement image belong to which of the light strips emitted with the light transmitter 10 and the transmitting optical system 20.

Figure 3:
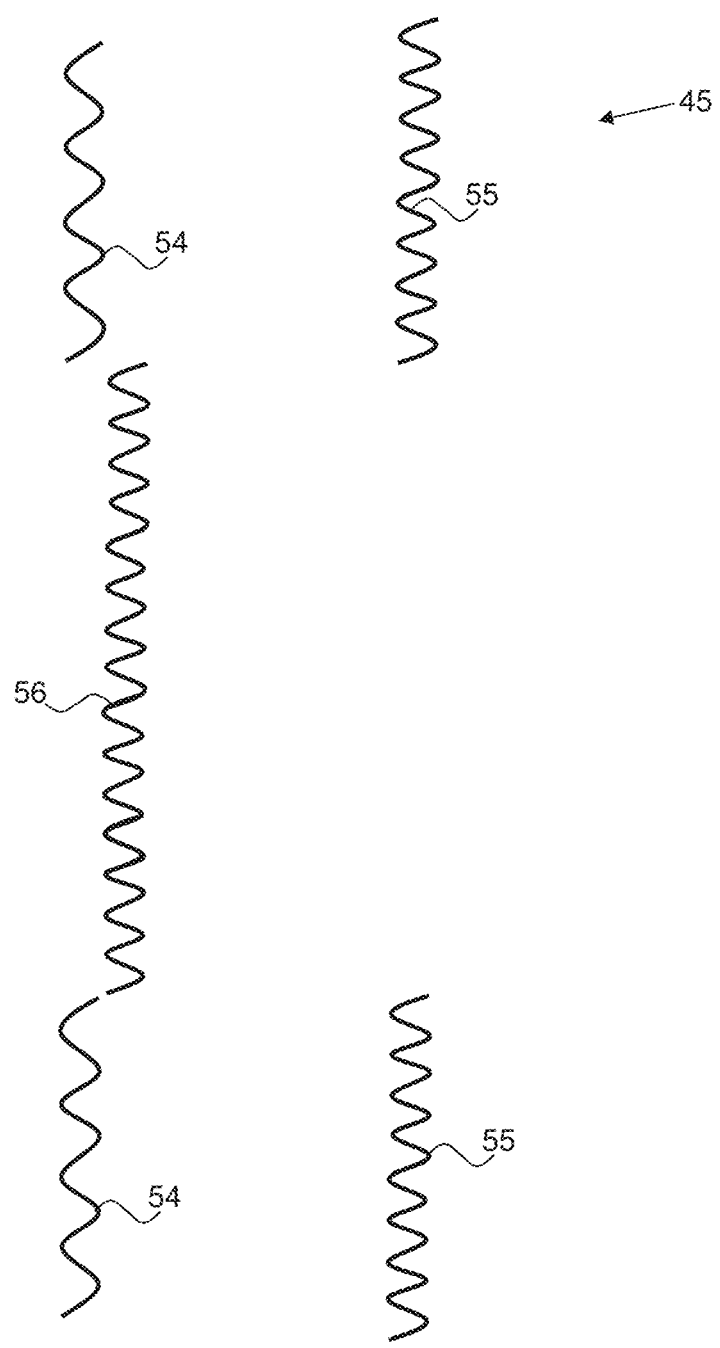
FIG. 3 shows an example measurement image of a further embodiment of a measuring device according to the invention.

The structures of the light strips can in principle be selected as desired, provided that the light strips have structures that can be differentiated from each other. A further example of a measurement image 45 is shown in FIG. 3. Here, once again, two light strips are recorded, which lead, in the measurement image, to a plurality of light strip portions 54, 55, 56. In this case, each light strip comprises a wave structure, for example a sinus waveform. The frequency of this waveform is different for different light strips, which in turn is achieved by the design of the transmitting optical system as a diffractive optical element. The light strip portions 55 and 56 have the same structure, namely a waveform with a higher frequency than a frequency of the waveform of the light strip portions 54. It can thus be concluded that the light strip portions 55 and 56 belong together and do not belong to the light strip portions 54.

Through the different light strip structures, it can advantageously be ascertained which light strip portions in the measurement image belong to the same light strips, and a certain emitted light strip can also be identified, to which these light strip portions belong. In particular, with emitted light strips extending parallel to each other, this is a significant advantage.

What is claimed is:

1. Measuring device for triangulation measurement, having
a light transmitter for emitting illuminating light,
a transmitting optical system, which directs the illuminating light in a plurality of light strips to an object,
a light receiver for generating a measurement image of the object by measuring light thrown back by illuminated object areas, and
an evaluation unit for determining form or position information of the object based on the measurement image, wherein
the transmitting optical system is designed, for the assignment of which area in the measurement image belongs to which light strip, in such a way that it directs the illuminating light in differently formed light strips to the object with respectively neighboring light strips being different from each other,
the transmitting optical system is designed so that each light strip comprises at least two neighboring lines, which have a different width, or wherein one neighboring line is a dotted or dashed line,
different light strips differ in the said width or in the type of the dotted or dashed line or in the arrangement of the dotted or dashed line relative to the other neighboring line of the same light strip, and
the transmitting optical system is designed so that a distance between neighboring light strips is greater than a distance between the neighboring lines which belong to the same light strip.

2. Measuring device according to claim 1, wherein
the transmitting optical system is designed so that each light strip comprises at least one wave line and different light strips differ in at least one of: a frequency, an amplitude, a phase or a form of the respective wave line.

3. Measuring device according to claim 1, wherein
the transmitting optical system comprises a diffractive optical element, which has a structure for generating the light strips.

4. Measuring device according to claim 3, wherein
the diffractive optical element is designed for a light wavelength range, in which it generates line forms, and
the light transmitter is designed so that solely illuminating light in this wavelength range is radiated onto the diffractive optical element.

5. Measuring device according to claim 1, wherein the transmitting optical system has a multi-mirror array, of which the mirrors are orientated so that impinging illuminating light is directed further in the different light strips.

6. Measuring device according to claim 1, wherein
the transmitting optical system has an array of microlenses, of which the lenses are arranged and formed so that impinging illuminating light is transmitted in the different light strips.

7. Measuring device according to claim 1, wherein
the evaluation unit is designed to identify discontinuous strip portions in the measurement image as parts of the same strip in that the evaluation unit detects a structure of each discontinuous portion and assigns those strip portions that have the same structure to the same strip.

8. Measuring device according to claim 1, wherein
all light strips are different from each other.

9. Measuring device according to claim 1, wherein
the at least two neighboring lines are parallel to each other.

10. Measuring device according to claim 1, wherein
all light strips are oriented parallel to each other.

11. Method for triangulation measurement, wherein
with a light transmitter, illuminating light is emitted,
with a transmitting optical system, the illuminating light is directed in a plurality of light strips in the direction of an object,
with a light receiver, light thrown back from illuminated object areas is measured and a measurement image of the object is thus recorded, and
with an evaluation unit, form or position information of the object is determined based on the measurement image,
wherein
for the assignment of which area in the measurement image belongs to which light strip, the illuminating light is directed with the transmitting optical system in differently formed light strips to the object with respectively neighboring light strips being different from each other,
each light strip comprising at least two neighboring lines, which have a different width, or wherein one neighboring line is a dotted or dashed line,
different light strips differ in the said width or in the type of the dotted or dashed line or in the arrangement of the dotted or dashed line relative to the other neighboring line of the same light strip, and
a distance between neighboring light strips is greater than a distance between the neighboring lines which belong to the same light strip.

12. Method according to claim 11, wherein
the transmitting optical system has a diffractive optical element, with which the different light strips are generated simultaneously and without movement of a component of the measuring device.

13. Method according to claim 11, wherein
each light strip comprises at least one wave line and different light strips differ in at least one of: a frequency, an amplitude, a phase or a form of the respective wave line.

14. Method according to claim 11, wherein
the evaluation unit identifies discontinuous strip portions in the measurement image as parts of the same strip in that the evaluation unit detects a structure of each discontinuous portion and assigns those strip portions that have the same structure to the same strip.

15. Method according to claim 11, wherein
the at least two neighboring lines are parallel to each other.

16. Method according to claim 11, wherein
all light strips are oriented parallel to each other.

17. Method according to claim 11, wherein
all light strips are different from each other.

* * * * *